UNITED STATES PATENT OFFICE.

JOHN LAVERY KANE, OF PHILADELPHIA, PENNSYLVANIA.

PRODUCTION OF AZO DYES.

1,333,807.            Specification of Letters Patent.     Patented Mar. 16, 1920.

No Drawing.      Application filed June 19, 1919. Serial No. 305,253.

*To all whom it may concern:*

Be it known that I, JOHN L. KANE, a citizen of the United States, residing at Philadelphia, in the county of Philadelphia and State of Pennsylvania, have invented new and useful Improvements in the Production of Azo Dyes, of which the following is a specification.

The present invention relates to the production of azo dyes by an improved method whereby the dyes acquire substantially greater brilliancy, strength and depth of color, and pureness of tone than are secured in the production of dyes in the ordinary methods heretofore described. This result is secured, according to the present invention, by the employment of starch or starchy materials, in the treatment of intermediates, especially those intermediates which consist of aromatic amino bodies, including anilin as typical bodies of this group.

The following specific example is given, it being understood that this is given as an illustration merely of the invention, and not as limiting the invention thereto:

Starch paste is first prepared by adding, say, 25–30% of dry starch to water, and then heating, for example on a water bath or steam bath, to 70–80° C.

To 4 parts of this starch paste, is added 9.3 parts of anilin, and 100 parts of water (hot or cold) and 36 parts of strong HCl (1.2 S. G.), and the mass well stirred. The mixture is then cooled to below 5° C., for example by adding ice. More HCl can be added if desired, and 7.2 parts of sodium nitrate dissolved in a small amount of water, is slowly added, while stirring and while maintaining the temperature at not above 5° C., for diazotization. This mixture is then poured slowly into a solution in, say, 400 parts of cold water, of 11 parts of meta phenylene diamin. The stirring is continued until the completion of the reaction, which requires only a short time.

The resulting product is a solution of the dye, and the latter can be separated by the usual methods, such as by salting out.

It is understood that in place of anilin, various other amino aromatic bodies can be used. Likewise, in place of meta phenylene diamin, various other aromatic bodies, including diamino bodies, monoamino bodies and the like. It is also understood that if an alkaline solution is to be employed for the coupling, phenolic bodies, sulfonic acid compounds of phenolic bodies and the like can be used.

The dye produced in the above specific example is a yellowish-brown powder soluble in water, which has the properties of dyeing wool, silk and tannin-mordanted cotton, a brilliant orange color, somewhat darker in shade than the dye which would be produced if the anilin were diazotized and coupled with meta phenylene diamin without the treatment with starch. The dyes produced in accordance with the present invention are also perfectly fast to light and washing.

After the complete mixing of the anilin with the starch paste and hydrochloric acid, there is produced the separation of what appears to be free carbon, the material being black and insoluble.

Starches from various sources can be used, including potato starch, wheat starch, maize starch, rye starch, sago, and the starches obtained from various other plants or vegetable products. It is to be understood that the amount of starch can be varied, depending upon the particular intermediates used, and other conditions.

While the dye produced by diazotization of anilin and the coupling with meta phenylene diamin (without the starch treatment) gives better results when a small amount of acetic acid (say 0.2% relative to the volume of the dye bath), the dye produced in the above specific example gives better results without the addition of this acid, thereby effecting a saving.

I claim:

1. In the production of azo dyes, the improvement which comprises treating an amino aromatic body with a starchy material, while in an aqueous vehicle.

2. A process which comprises heating starch in water, adding a mineral acid, and an amino aromatic body, thereafter diazotizing the amino body and coupling with an aromatic derivative to form a dye.

3. A process which comprises heating starch in water, adding a mineral acid, and anilin, thereafter diazotizing the anilin and coupling with an aromatic derivative to form a dye.

4. The process which comprises treating anilin with an acid and starch paste, then diazotizing and coupling with an aromatic amino body.

5. The process which comprises treating anilin with an acid and starch paste, then diazotizing and coupling with meta phenylene diamin.

6. A class of azo dyes of enhanced brilliancy, clearness and strength of color, as compared with the hitherto known azo dyes, which new dyes can be obtained by adding starch paste to the aromatic amins before diazotization, and thereafter coupling in the known manner.

In testimony whereof I affix my signature.

JOHN LAVERY KANE.